United States Patent [19]
Stone

[11] 3,906,358
[45] Sept. 16, 1975

[54] PROBE TRAIN INCLUDING A FLAW DETECTOR AND A RADIATION RESPONSIVE RECORDING MEANS WITH ALIGNMENT MEANS HAVING A NATURAL CURVED CAST

[75] Inventor: Robert Martin Stone, Chattanooga, Tenn.

[73] Assignee: Combustion Engineering, Inc., Windsor, Conn.

[22] Filed: Nov. 12, 1973

[21] Appl. No.: 415,060

[52] U.S. Cl. .................. 324/37; 250/321; 250/360
[51] Int. Cl. ............................................. G01r 33/12
[58] Field of Search ............................. 324/37, 40; 250/320–323, 360; 73/67.5 R

[56] References Cited
UNITED STATES PATENTS

| | | | |
|---|---|---|---|
| 2,470,338 | 5/1949 | Chilton | 324/37 |
| 2,532,536 | 12/1950 | Boucher | 250/321 |
| 2,702,864 | 2/1955 | McKee | 250/360 |
| 3,182,197 | 5/1965 | Putnam et al. | 250/321 |
| 3,243,697 | 3/1966 | Schmidt | 324/37 |
| 3,492,477 | 1/1970 | Arnesen | 250/322 |

*Primary Examiner*—Robert J. Corcoran

[57] ABSTRACT

An inspection system for a multitube steam generator comprising a probe train for insertion in a tube to be inspected, which probe train includes, in series, directional probe means, such as an eddy current probe, for indicating the longitudinal and angular location of an irregularity at or in the wall of the tube, and radiation responsive recording means nonrotatable relative to the eddy current probe during operation and in substantially close longitudinal relationship thereto for receiving an image of the irregularity when laterally adjacent thereto; elongated alignment means joined to at least one end of the probe train against rotation relative thereto and insertable in the tube for controlling or determining the angular orientation of the probe train within the tube; means for propelling the probe train longitudinally within the tube; and a source of radiation insertable in another tube of the steam generator to a position therealong laterally adjacent the indicated irregularity for irradiation of the irregularity to project said image on the recording means.

The directional probe means may preferably be an eddy current probe and the radiation responsive recording means may preferably be a film bearing cassette probe. The alignment means may be provided by a resilient naturally curved plastic cable, which cable might also be used to propel the probe train.

2 Claims, 19 Drawing Figures

PROBE TRAIN INCLUDING A FLAW DETECTOR AND A RADIATION RESPONSIVE RECORDING MEANS WITH ALIGNMENT MEANS HAVING A NATURAL CURVED CAST

BACKGROUND OF THE DISCLOSURE

The invention relates to an inspection system for steam generator tubing. More specifically it relates to an inspection system which includes means for locating both the circumferential and longitudinal position of an irregularity in a tube and a means for radiographically inspecting the irregularity.

From time to time in multitube steam generators, as in nuclear power systems, it may be necessary to inspect one or more of the tubes to determine the existence and location of irregularities or flaws therein. Further, it may then be desirable to further inspect any such flaws to learn their geometry and similar characteristics. Because of the inaccessability of the tubes, which may number many thousand, remotely positioned sensors have been employed. Further, as the exterior surface of the tubes are not easily accessible when mounted in a steam generator, the sensors are generally inserted within the tubes. These sensors have generally been of the ultrasonic or eddy current type and have been able to indicate the existence of a flaw or the like, its longitudinal position along the tube and rough geometry. However, a more refined inspection has not generally been possible.

Recent developments have provided a directional probe, of the eddy current type, capable of revealing the angular position of a flaw, as disclosed in U.S. Pat. application Ser. No. 415,028 for Directional Eddy Current Probe by G. R. Madewell, filed Nov. 12, 1973. Further, a technique for radiographically inspecting a flaw has been developed, as disclosed in U.S. Pat. application Ser. No. 415,042 for Radio-Graphic Inspection of Steam Generator Tubes by C. T. Ward, filed Nov. 12, 1973. Also, means have been developed for determining or controlling the angular orientation of a probe within a curved tubular conduit, as disclosed in U.S. Pat. application Ser. No. 415,021 for Remote Orientation of a Probe in a Tubular Conduit by C. T. Ward, D. L. Mathis and F. T. Radcliff, filed Nov. 12, 1973.

SUMMARY OF THE INVENTION

According to the invention there is provided an inspection system for a multitube steam generator, comprising a probe train for insertion in a tube to be inspected, which probe train includes in series, directional probe means for indicating the longitudinal and angular location of an irregularity at the wall of said tube, and radiation responsive recording means nonrotatable relative to said directional probe means during operation and in substantially close longitudinal relationship thereto, for receiving an image of said irregularity when laterally adjacent thereto; elongated alignment means joined to at least one end of said probe train against rotation relative thereto and insertable in said tube for determining the angular orientation of said probe train within said tube; means for propelling said probe train longitudinally within said tube; and a source of radiation insertable in another tube of said steam generator to a position therealong laterally adjacent said indicated irregularity for irradiation thereof to project said image on said recording means.

The directional probe means preferably comprise an eddy current probe and the radiation responsive recording means is preferably a film bearing cassette probe, the film extending at least partially around the probe. The film is capable of being rotationally oriented at any angle prior to insertion and operation. A naturally curved plastic cable may provide the alignment means. The plastic cable might also serve to propel the probe train by means of a longitudinal driving force applied thereto. A metal cable within the plastic cable might alternatively serve the latter function.

The probe train may be initially inserted to establish the longitudinal and angular or azimuthal location of an irregularity and then be withdrawn to position the cassette probe and film at the proper rotational orientation to receive the image of the irregularity when the probe train is next inserted and the radiation source is positioned. The step of withdrawing the probe train and orienting the film might be omitted if the film completely encircles the cassette probe.

For a better understanding of the invention, its operating advantages and the specific objects obtained by its use, reference should be made to the accompanying drawings and description which relate to a preferred embodiment of the invention.

BRIEF DESCRIPTION OF THE DRAWINGS

FIG. 4b depicts the angular extent of close electromagnetic coupling between the tube and the coil of FIG. 4a.

FIG. 5b depicts the angular extent of close electromagnetic coupling between the tube and the coil of FIG. 5a.

FIG. 6b depicts the angular extent of close electromagnetic coupling between the tube and the coil of FIG. 6a.

DESCRIPTION OF THE PREFERRED EMBODIMENT

Figure 1:
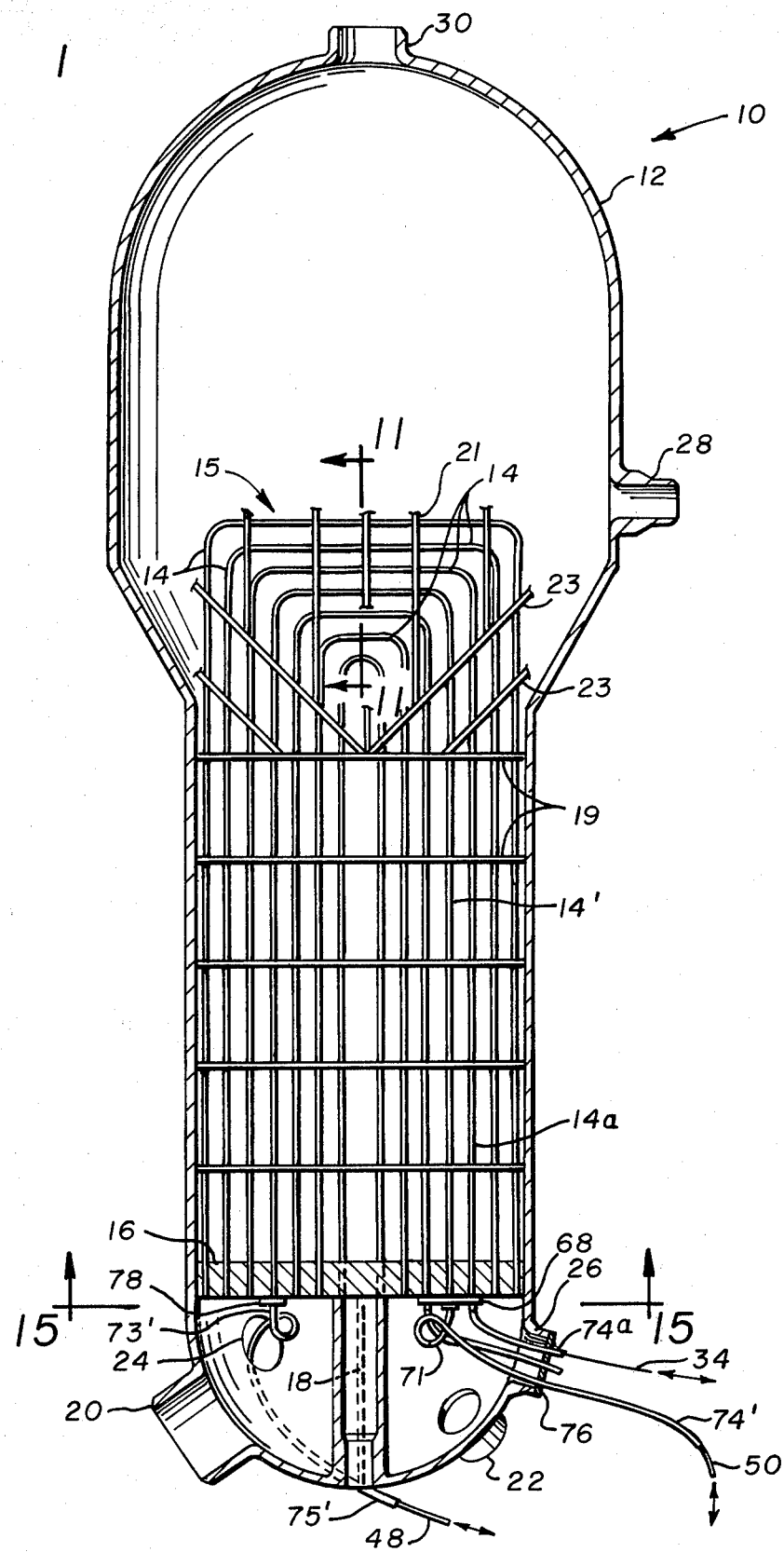
FIG. 1 is a vertical sectional view of a steam generator taken through the center thereof parallel the rows of tubes therein with the tube inspection means operationally positioned.

Referring now to FIG. 1, there is depicted a nuclear steam generator 10 including a vessel 12 having a large number of heat exchange tubes 14 supported therein and terminating at one or both ends in a tube sheet 16. Tube sheet 16 is about 12 feet in diameter and is supported by vessel 12. In the steam generator 10 depicted, tubes 14 are shaped as an inverted "U" with the two legs extending vertically upward from tube sheet 16 on opposite sides of the vertical midplane of the steam generator, and the nexus connecting the two legs at their upper ends either through two spaced 90° curved bends or a single 180° bend. Tubes 14 are hollow and circular in cross section and their ends extend through cylindrical bores extending vertically through the horizontal tube sheet 16. Tubes 14 are secured to the tube sheet 16, as by welding. Typically, a tube 14 has an outside diameter of about three-fourths inch and an inside diameter of five-eighths inch and is formed of corrosion resisting alloy, such as conductive, generally non-ferritic, stainless steel.

Tubes 14 may number between 7,000 and 9,000 and are in a bundle 15 which is comprised of more than 100 side-by-side parallel rows of tubes, each row including from one to 50 or more tubes in nested arrangement, a typical such row appearing in FIG. 1. The nesting of tubes 14 in a row is accomplished by making the vertical and horizontal portions of a tube near the midplane of the generator of particular lengths and progressively increasing these lengths for those tubes further away from the midplane.

The vertical run of a leg of a short tube 14 might be 19 to 23 feet and the nexus between the pair of legs is formed by a section of tube bent 180° about a 2½ inch radius. The vertical run of a leg of a long tube 14 might be 23 to 29 feet and the nexus between the pair of legs formed by a horizontally extending section of tubing about 7 to 11 feet long having a 90° bend of about 10 inch radius on each end.

Figure 11:
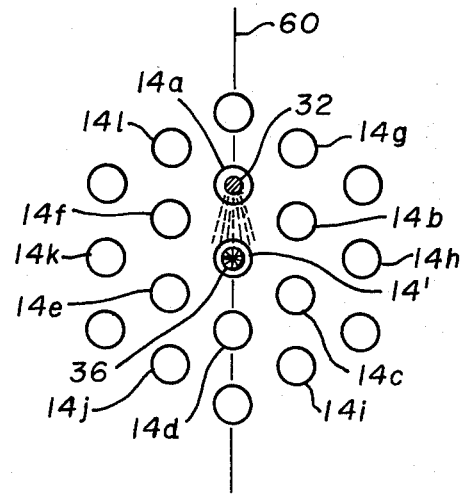
FIG. 11 is a sectional view of a portion of the tube bundle taken normal to the centerline of the tubes along line 11—11 of FIG. 1.
Figure 15:
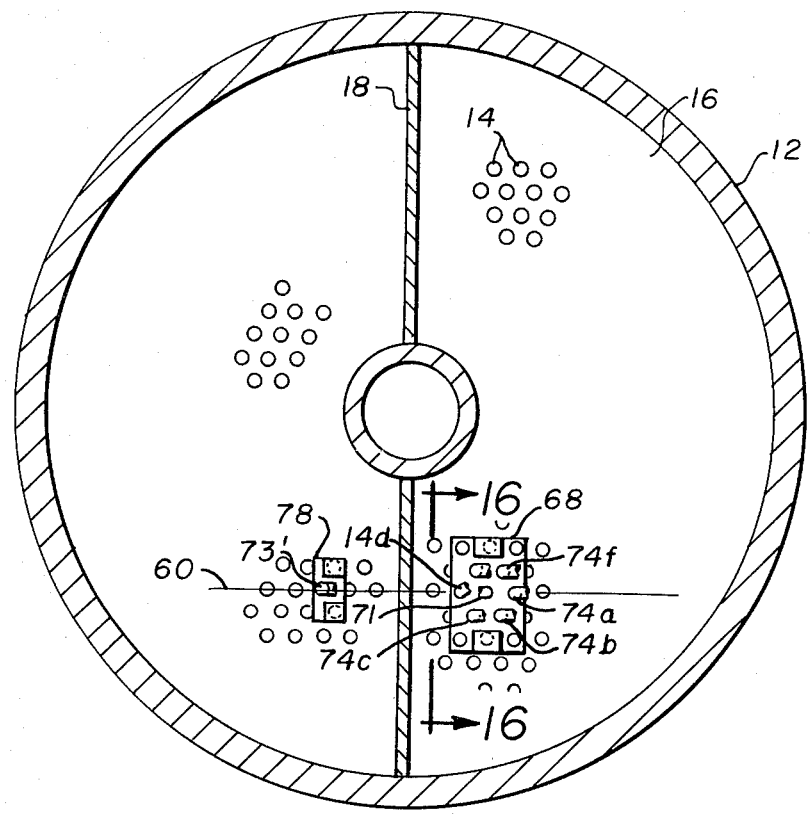
FIG. 15 is an underside view of the tube sheet of FIG. 1 taken along line 15—15 to show the cable guiding and aligning fixtures.

While the various rows of tubes are parallel one another, adjacent rows may be aligned in one design, or offset in another design, the latter being described and depicted herein, as in FIGS. 11 and 15. The tubes 14 of one row are offset relative to the tubes in the rows on either side of it by an amount which is one-half the center-to-center pitch between tubes in a row. In this embodiment, the center-to-center pitch is 1 inch. This arrangement results in the pattern seen in FIGS. 11 and 15, in which six tubes 14 are approximately equiangularly and equidistantly spaced about any particular tube. This pattern holds true for most of the tube bundle 15, the exceptions of course occurring about the perimeter of the bundle.

Additional support and alignment of the tubes 14 may be provided by various means, including horizontally extending, vertically spaced support grids 19 which each may contact and laterally support each leg of each tube at four approximately equiangularly spaced positions about its circumference; vertically extending, horizontally spaced support grids 21 which each may contact and support the nexus portion of most, and sometimes all, of the tubes at four approximately equiangularly spaced positions about its circumference; and obliquely arranged support straps 23 which may contact and laterally support most, and sometimes all, of the tubes at two or more equiangularly spaced positions about the tube's circumference in the region between supports 19 and 21. For a more thorough description of these several supports, reference may be made to U.S. Pat. No. 3,575,236 issued Apr. 20, 1971, to Nicholas D. Romanos entitled Formed Plate Tube Spacer Structure.

Tube sheet 16 is fixedly positioned some 5 feet above the lower end of vessel 12. A divider plate 18 extends from tube sheet 16 to the bottom of vessel 12 along the midplane to sealingly divide the lower end of vessel 12 into an inlet side and an outlet side, respectively communicating with opposite ends of tubes 14. A fluid inlet nozzle 20 provides primary fluid entry to vessel 12 and tubes 14 on one side of divider 18. One or more fluid outlet nozzles 22 provides egress of primary fluid from the tubes 14 and vessel 12 on the other side of divider 18. A manway 24 allows human access, by man or machine, to the primary inlet side of vessel 12 below tube sheet 16 and a manway 26 allows similar access to the primary outlet side. Vessel 12 also includes a feedwater inlet 28 and a steam outlet nozzle 30 on the secondary side of steam generator 10.

From time to time, it may be desirable to inspect various tubes 14, particularly if leaks or weaknesses are suspected. The search may be confined to tubes in various suspect regions of bundle 15 and done in a fairly rapid manner by inserting eddy-current and/or ultrasonic search probes in the suspect tubes. Such initial search is generally capable of determining the presence of an irregularity along the wall of any particular tube 14' and its longitudinal location along the tube. However, it is also desirable to ascertain the angular location of the irregularity of flaw, both for analytical reasons and particularly for subsequent inspection by other means, such as radiography.

Figure 2:
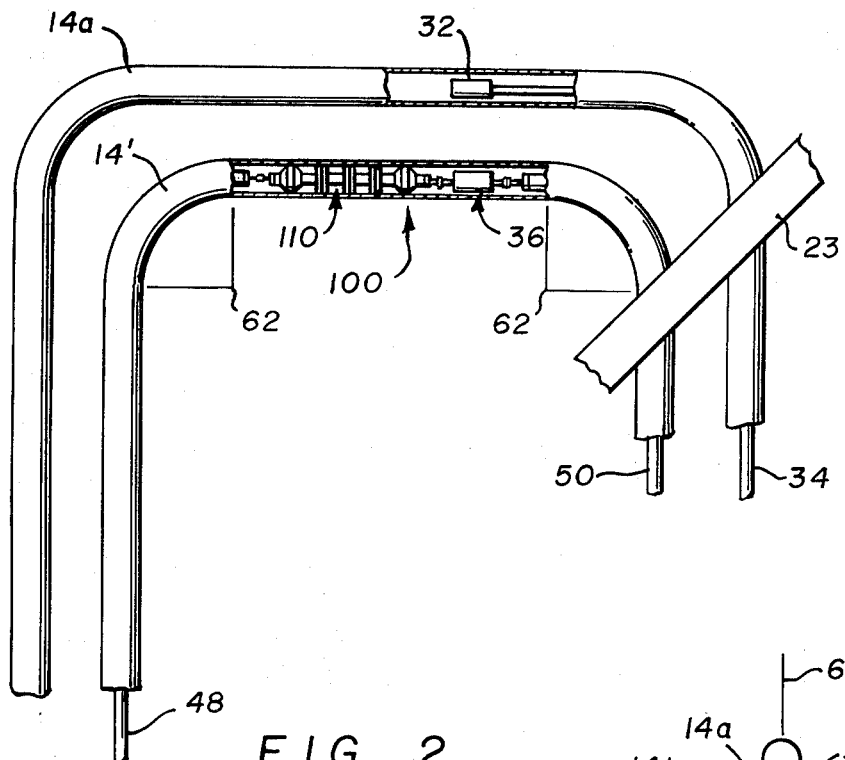
FIG. 2 is a view of selected tubes of FIG. 1 with parts cut away to reveal the radiation source and sensors therewithin positioned to radiographically inspect a tube.
Figure 3:
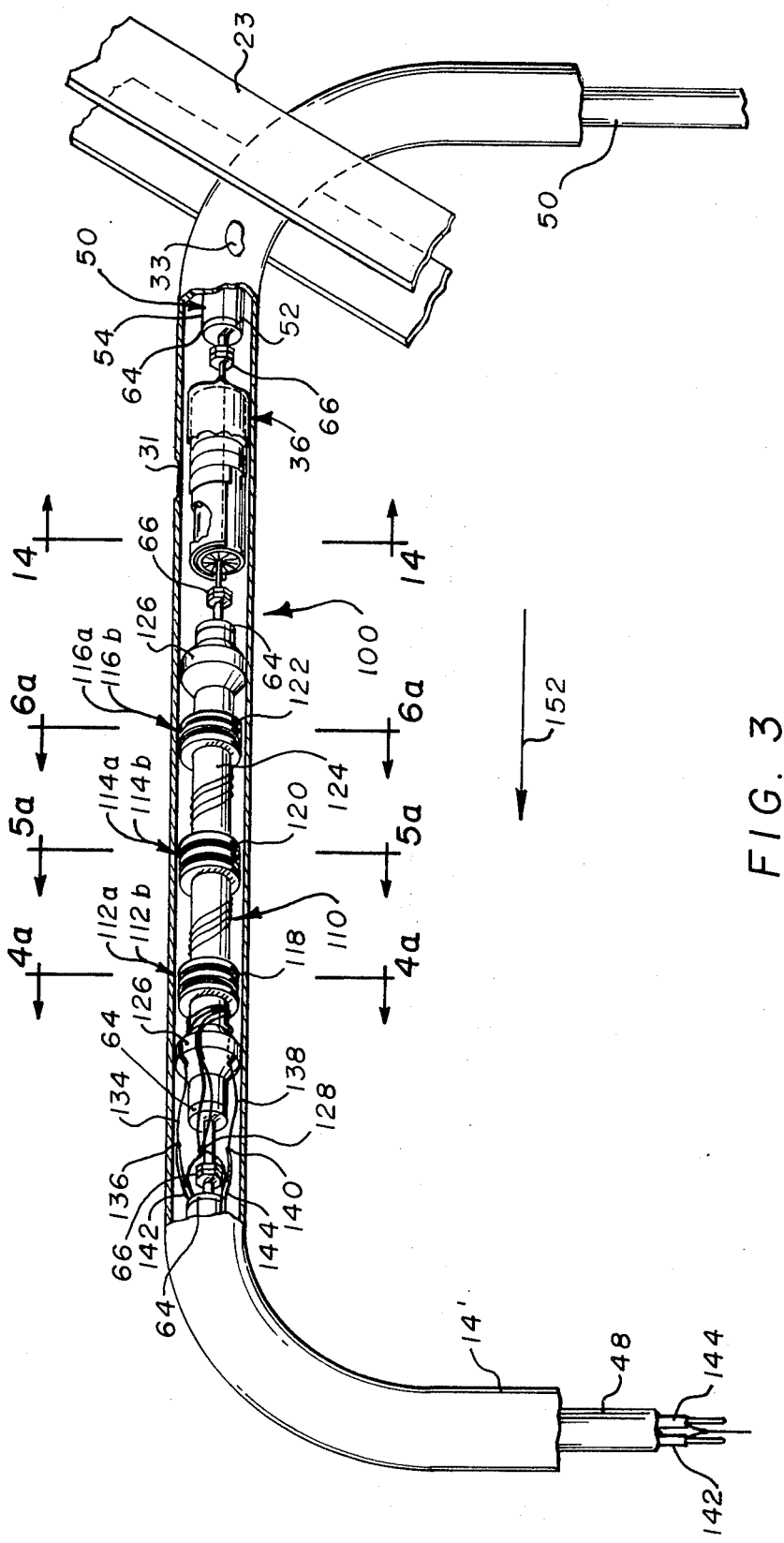
FIG. 3 is an enlarged perspective view of the tube of FIG. 2 housing the sensors to show them in greater detail.

Referring to FIGS. 1 through 3 there is shown apparatus for determining the longitudinal and angular location of an irregularity at or in the wall of tube 14' and for subsequently radiographically inspecting the irregularity in greater detail in situ. This apparatus includes a directional sensor such as eddy current probe 110, connected nonrotatably in series with radiation responsive recording means, such as film cassette probe 36, to form a probe train 100. Further, it includes means, such as cables 48 and/or 50, nonrotatably connected to one or the other or both of probes 36 and 110 for determining or controlling their angular orientation within tube 14' and which may propel the probes longitudinally within the tube in response to a longitudinal force applied thereto. Also, it includes a source of radiation, such as pill 32, which is insertable in a tube near tube 14' for irradiating the irregularity in tube 14' and projecting its image onto the film of cassette probe 36.

In FIGS. 2 and 3 there is shown a particular tube 14' selected for inspection and having an irregularity, such as recess 31, in the outside diameter of the tube nexus along its uppermost surface and another irregularity, such as recess or crack 33, in the outside diameter of the tube nexus about midway between top and bottom. Further, there is depicted a single pair of opposed support straps 23, earlier described, which like supports 19 and 21 are formed of a ferritic material, such as carbon steel. These straps 23 are proximate or contact the outside diameter of tube 14' about midway between the top and bottom of the nexus on either side thereof. It will be appreciated that various other supports 21 and 23 are proximate or contact the nexus of tube 14' at spaced intervals, but are not shown for the sake of clarity.

Eddy current probe 110, in the preferred embodiment, comprises three coil means 112, 114 and 116, respectively comprising coil pairs 112a and 112b, 114a and 114b, and 116a and 116b, respectively supported in longitudinally spaced relationship by bobbins 118, 120 and 122 in turn supported by elongated, tubular support member 124. The spacing between adjacent coil means 112, 114 and 116 may range from an inch or less to 6 inches or more, depending on the structure under inspection.

Coil support member 124 may be a piece of nylon tubing having an O.D. of three-eighths inch and being from several inches to a foot or more in length, depending on the number of coils thereon, and their spacing. Member 124 is preferably resiliently flexible to facilitate traversal of probe 110 through bends or curves in tube 14'. It might of course be rigid if no bends were to be encountered. Member 124 is here shown and described as a discrete element, however it will be appreciated that it might be an integral portion of cable 48 or 50 instead.

The coil supporting bobbins 118, 120 and 122 each may be annular elements of hard nylon or the like, having an I.D. substantially the same as the O.D. of the support member 124 and an O.D. which is slightly less than the I.D. of tube 14' to allow free passage therewithin. Each bobbin 118, 120 and 122 is secured to support member 124 against rotation relative thereto, as by means of a glued or cemented joint. Some form of keying device might also or alternatively be used. Bobbins 118, 120 and 122 respectively each include a pair of closely spaced grooves extending completely therearound. However each groove is of a first, uniform shallow depth over an arc length of about 120°, with the remainder being of a significantly increased depth such that its base approaches or equals the I.D. of the particular bobbin. Both grooves on a particular bobbin are rotationally or angularly the same or aligned with one another, as viewed along the longitudinal centerline of probe support member 124. However, the shallow depth arc sections of each pair of grooves on each bobbin are rotated 120° from those on the other two bobbins.

Figure 4A:
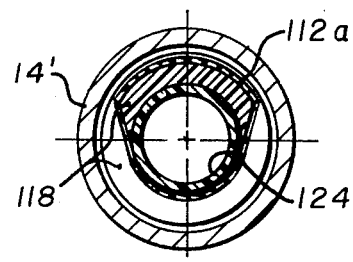
FIG. 4a is a sectional view of the tube containing the eddy current probe taken along line 4a—4a of FIG. 3 to show one coil of the probe.
Figure 5A:
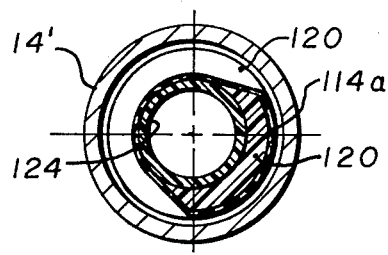
FIG. 5a is a sectional view of the tube containing the eddy current probe taken along line 5a—5a of FIG. 3 to show another coil of the probe.
Figure 6A:
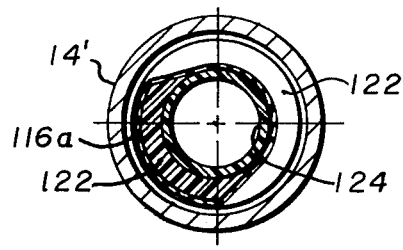
FIG. 6a is a sectional view of the tube containing the eddy current probe taken along line 6a—6a of FIG. 3 to show still another coil of the probe.

Coil pairs 112a and 112b, and 114a and 114b and 116a and 116b are formed by winding the same number of turns of enameled magnet wire on bobbins 118, 120 and 122 in each of the six grooves, with the resulting coils having an eccentric or somewhat cam-like appearance when viewed along the centerline of probe support member 124. Coil means 112, 114 and 116 are thus each eccentrically disposed relative to the centerline of member 124, each having an arc segment of about 120° of greatest diameter to place that part of the coil in close proximity with the wall of tube 14', as seen in FIGS. 4a, 5a and 6a. The remaining segment of each coil means has a radius, relative to the centerline of member 124, which may vary somewhat but is substantially less than the first segment.

In the preferred embodiment, with probe 110 centered within tube 14', the large diameter arc segment of each coil means 112, 114 and 116 may be spaced from the wall of the tube by about 1/32 inch, whereas the remainder might be spaced up to 5/16 inch. This differential in spacing is sufficient to create a marked difference in the electromagnetic coupling and interaction between the coil and the tube 14', with the closer spacing resulting in the closer coupling. As a result, an irregularity such as recesses 31 or 33, or even straps 23, will have a much greater effect on the signal of a coil close to it than one spaced farther away. It is this property which probe 110 utilizes for directional sensitivity. Two or more centering spacers 126 are concentrically disposed about and affixed, as by cementing, to probe support member 124 at longitudinally spaced positions to maintain the probe 110 in a centered position in tube 14'. Each spacer 126 is generally annular in shape, having a major diameter substantially the same as the I.D. of tube 14' for contacting, sliding engagement therewith and tapering radially inward toward the end to facilitate introduction to and movement within tube 14'. Each spacer 126 may be longitudinally split or grooved at several places around its circumference to create somewhat flexible spokes, not shown, to facilitate transit of small radius tube bends. Spacers 126, like bobbins 118, 120 and 122, are of nylon or the like to permit relatively easy sliding contact with tube 14' without damaging the tube or introducing materials which might not be acceptable in such an environment.

Figure 4B:
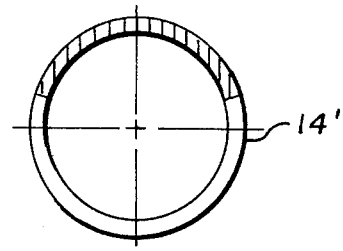
Figure 5B:
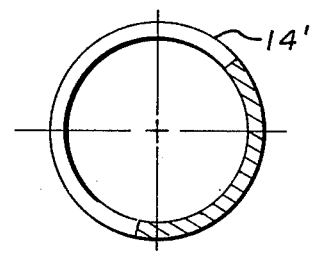
Figure 6B:
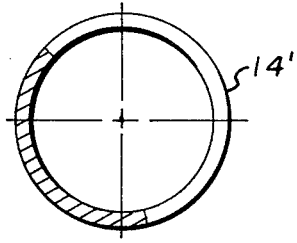
Figure 7:
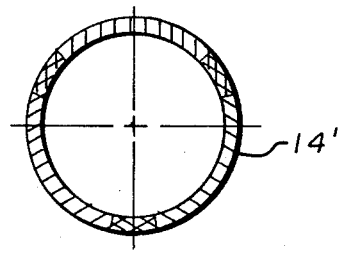
FIG. 7 is a somewhat diagrammatic, composite view of FIGS. 4b, 5b, and 6b to show the angular extent of the close electromagnetic coupling between the several coils and the tube.

FIGS. 4b, 5b and 6b respectively depict the angular extent of close electromagnetic coupling between coils 112, 114 and 116 and tube 14' about its circumference, this region being indicated by shading. It will be noticed that while the angular extent of closest spacing between a coil means 112, 114 or 116 and tube 14' might be 120°, the angular extent of close electromagnetic coupling will generally be greater, for instance 145°. Further, it will be noted that the regions of close electromagnetic coupling for the coil means 112, 114 and 116 are rotated equiangularly from one another and provide some degree of overlap, in this instance 25°. The angular extent of close spacing between a coil means and the tube might be as little as 90° and still obtain complete coverage with three coil means. The combined regions of close electromagnetic coupling for all of the coils 112, 114 and 116 are depicted in FIG. 7, revealing close coupling about the entire circumference of tube 14', with a particular different angular region associated with each of the three coil means. It will of course be appreciated that more than three such coil means, each closely coupled over its angular extent of proximity with tube 14', might be employed for greater angular resolution if such is necessary.

In FIGS. 2 through 7, probe 110 and coil means 112, 114 and 116 are depicted as having a particular angular or azimuthal relationship to tube 14', with coil means 112 centered about the "12 o'clock" position of the tube circumference, that position being at the outermost and uppermost extremes of the tube along its length. The means for effecting this positioning will be described in greater detail below.

Figure 8:
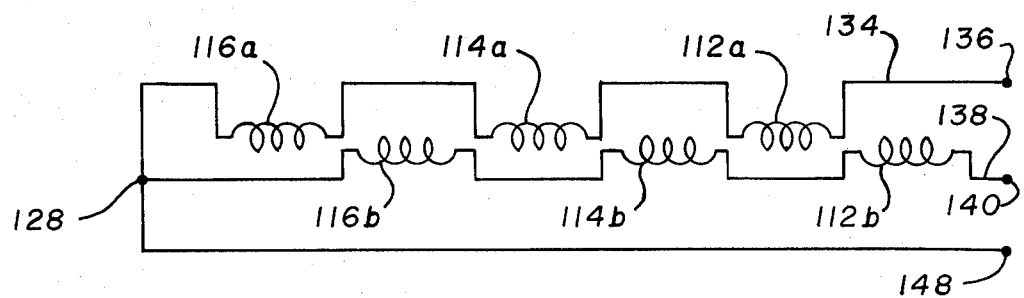
FIG. 8 is a simple schematic diagram of the electrical portion of the eddy current probe.
Figure 9:
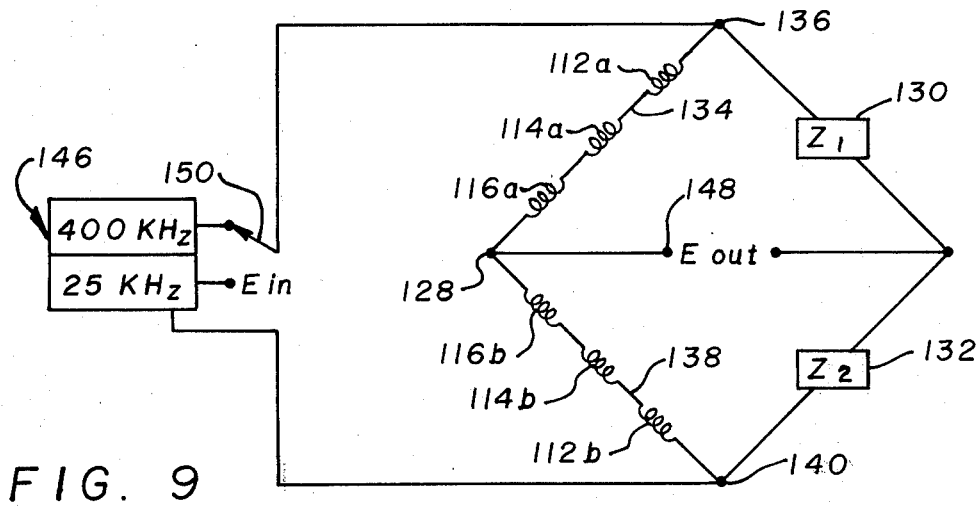
FIG. 9 is a schematic diagram of a typical bridge arrangement showing the coils of the eddy current probe connected therein.

Referring to FIGS. 3, 8 and 9, the circuitry of probe 110 will be described in greater detail. As earlier mentioned, coil means 112, 114 and 116 are respectively comprised of coil pairs 112a and 112b, 114a and 114b, and 116a and 116b. Coils 112a, 114a and 116a are wound on bobbins 118, 120 and 122 respectively and are connected electrically in series and coils 112b, 114b and 116b are wound on bobbins 118, 120 and 122 and are also connected electrically in series. The coils 112a, 114a and 116a are connected in series opposing relationship with coils 112b, 114b and 116b at junction 128, with coils 112a, 114a and 116a forming one leg of an impedance bridge, coils 112b, 114b and 116b forming another leg, and impedances 130 and 132 each forming one of the other two legs of the bridge. One or both of impedances 130 and 132 can be made variable to aid in null balacing the bridge.

In forming the coils of probe 110, enameled magnet wire 134 having end terminals 136 and 128 is used to wind coils 112a, 114a and 116a; and wire 138, having end terminals 140 and 128 is used to wind coils 112b, 114b and 116b.

Terminals 128 on wires 134 and 138 may be joined electrically, as by soldering. That portion of wires 134 and 138 extending between terminal 128 and bobbin 122 for coil means 116 does so in deep longitudinal notches in one spacer 126 and bobbins 112, 114 and part of 116. These notches are deep enough in the bobbins to place the wires beneath the coils subsequently wound thereover. Each coil is then wound, beginning with bobbin 116 and finishing with bobbin 112 and using wires 134 and 138 to form the a series and b series coils respectively. These ends of the wires also enter and exit the coil-seating grooves of the bobbins and spacer by means of the same or similar longitudinally extending notches. As seen in FIG. 3, wires 134 and 138 preferably partially or completely encircle support member 124 between bobbins to permit flexure and bending of probe 110 at bends in tube 14'.

Terminal 136 of wire 134 is connected, as by soldering, to the center conductor of a standard small diameter coaxial cable 142, and terminal 128 is similarly connected to the shield conductor of the coaxial cable. Terminal 140 of wire 138 is connected, as by soldering, to the center conductor of another coaxial cable 144, similar to 142, and terminal 128 is similarly connected to its shield conductor. As shown in FIG. 3, coaxial cables 142 and 144 extend within and beyond both ends of a hollow cable 48, to be later described, to connect terminals 138 and 140 across an input oscillator 146 and to connect terminal 128 to terminal 148 of the bridge output. If coil support member 124 is simply an integral extension of cable 48, the coaxial cables 142 and 144, or their conductors, may extend beyond the end or through an opening in the side of cable 48 underlying probe 110 to make the connections 128, 136 and 140. The exposed portions of the coaxial cables may then be taped to the outer periphery of cable 48 to protect the connections if the conductors are inadvertently pulled at the other end.

Oscillator 146 is capable of providing an input signal at two different frequencies, for instance 25 KHZ and 400 KHZ, and a single pole double throw switch 150 connects coil means 112, 114 and 116 to one frequency or the other. For inspection of the wall of a tube, such as 14' which is nonferritic, a search frequency of 400 KHZ is generally effective and reduces the effects of ferritic members such as supports 19, 21 and 23. On the other hand, if it is desirable to note the location of such a support member, as for reference purposes, a lower frequency such as 25 KHZ is preferable. It will be appreciated that neither of these frequencies is critical.

Figure 10:
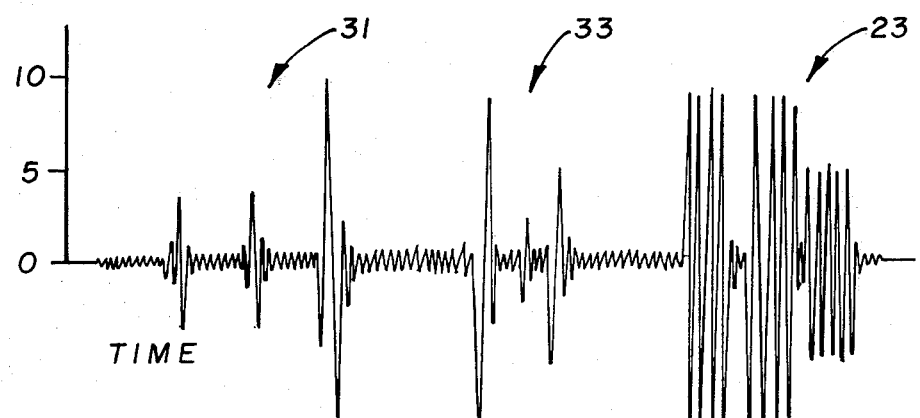
FIG. 10 is the display pattern of the output of the bridge in which the eddy current probe is connected, as the probe is moved in the direction of arrow 152 in FIG. 3.

Assuming that probe 110 is moved through tube 14' in the direction indicated by arrow 152 in FIG. 3 with the angular or rotational orientation depicted in FIGS. 3 through 7, and that discontinuities 31 and 33 occur as described and depicted in FIGS. 3 and 7, an output signal such as that depicted in FIG. 10 will result. FIG. 10 is the trace, as by a conventional brush recorder, of the $E_{out}$ signal of the impedance bridge showing the relative amplitudes of the output signal as each of the coils of probe 110 is adjacent normal wall sections of tube 14' and adjacent areas having irregularities. The three excursions of the signal from the normal, at the right end of the FIG. 10 trace, result from the probe 110 passing adjacent support straps 23 of FIG. 3 with an $E_{in}$ frequency of 25 KHZ. Moving leftward, the next three excursions result from each of the three coils of probe 110 passing adjacent irregularity 33 with an $E_{in}$ frequency of 400 KHZ. The last three excursions, appearing near the left side of FIG. 10, result from the coils of probe 110 passing adjacent irregularity or flaw 31. The FIG. 10 trace measures signal amplitude along the "Y" axis and time (or distance) along the "X" axis. It will be appreciated that time will bear a known relationship to the longitudinal position of probe 110, thereby permitting meaningful interpretation of the trace. The trace of FIG. 10 was made with probe 110 advancing at one speed as it passed support 23 and irregularity 31, but at a faster speed as it passed irregularity 33. Generally a constant speed throughout is to be preferred, but is in no way essential.

In FIG. 10, the right-most excursion in each group of three excursions in the signal trace is provided by the leading coil means 112, the middle excursion being associated with coil means 114, and the left-most excursion in the group being associated with coil means 116. Through analysis of the relative amplitudes of the signals from each of the coil means 112, 114 and 116 when they pass adjacent an irregularity, it is possible to determine the angular location of the irregularity about a circle normal to the length and direction of travel of probe 110.

For instance, the three signal excursions caused by irregularity 33 show an amplitude of about five units for coil means 112, two units for coil means 114 and nine units for coil means 116. This indicates that irregularity 33 is nearest the center of the arc segment of close coupling covered by coil means 116, is angularly somewhat more distant from the center of the arc segment of close coupling of coil means 112 and is angularly more distant still from the center of the arc segment of close coupling of coil means 114. Accordingly, irregularity 33 is somewhere within the 145° of close coupling of coil means 116, toward the coil means 112 side as opposed to the coil means 114 side, but relatively close to the center of coil means 116. Coil means 112 might be viewed as centered on the 12 o'clock position of tube 14, coil means 114 is centered on the 4 o'clock position and coil means 116 is centered on the 8 o'clock position. Therefore, irregularity 33 would be expected to exist at about the 9 o'clock position, as it does.

Similarly, with the three signal excursions representative of the location of irregularity 31, the irregularity would be within the arc segment of close coupling of coil means 112 and about equidistant from the close-coupling arc segments of coil means 114 and 116. Therefore, irregularity 31 would be expected to be located at about the 12 o'clock position, as it is.

The signal excursions caused by support straps 23 may be used for reference purposes, to verify the rotational or angular orientation of probe 110 within tube 14' as it passes adjacent the straps. The angular locations of straps 23 relative to tube 14' are known and the indication of strap positioning provided by probe 110 will verify the rotational positioning of the probe within the tube. In FIG. 10, the three signal excursions resulting from the coil means 112, 114 and 116 passing straps 23 indicate that the probe is rotationally oriented such that coil means 112 has its region of close coupling centered angularly on either the 12 o'clock or 6 o'clock position of tube 14'. However, with the probe positioning means to be later described, any twist error would be expected to be much less than 90° from the intended angular orientation, thus identifying only that angular indication closest to the intended angular orientation as being the actual angular orientation of probe 110. As the longitudinal location of straps 23 and support grids 19 and 21 are known, they also serve as references for the longitudinal location of probe 110.

It will be appreciated that the spacing between coils 112, 114 and 116 may be changed if the spacing between supports 21 or 23 is such as to interfere with obtaining accurate and meaningful information about a tube irregularity, such as 31 or 33. This may be done most conveniently by providing several probes 110 having different coil spacings and interchangably connectable into probe train 100. Alternatively, the spacing between an adjacent pair of coils, i.e., 112 and 114, might be made different from that between another adjacent pair of coils, i.e., 114 and 116.

Figure 12:
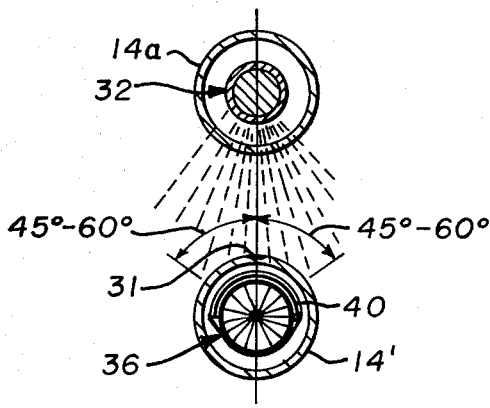
FIG. 12 is an enlarged view of selected tubes in FIG. 11 showing the angular relationship between the radiation source and the film probe relative to the centerline of the probe and tube.
Figure 14:
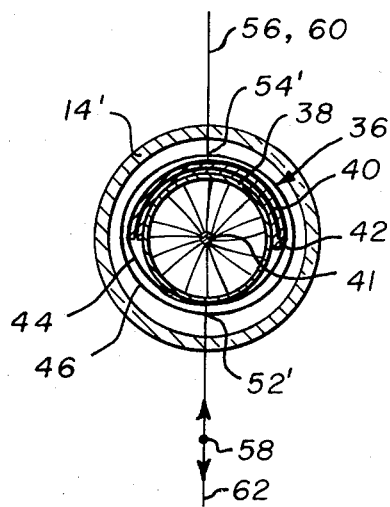
FIG. 14 is a sectional view of the tube and film probe of FIG. 3 taken normal to the centerline thereof along line 14—14 to show the predetermined rotational or angular orientation of the probe with the tube.

Referring to the radiographic inspection means depicted in FIGS. 3, 12 and 14, a film cassette probe 36 is joined nonrotatably in series with eddy current probe 110 to form probe train 100 for insertion in a tube, such as tube 14', and a radiation source "pill" 32 is insertable into another tube, for instance 14a, adjacent tube 14'.

Film cassette probe 36 comprises a cylindrical, hollow form or cartridge 38 of resiliently flexible material, such as elastomer tubing, supporting a piece of slow-speed photographic or a radiographic film 40. A support spine 41 having a longitudinally extending center wire or cable and wire ribs extending radially therefrom extends through cartridge 38 and is concentric therewith. The wire ribs of spine 41 are sufficiently numerous, long and rigid to snugly engage the interior wall of cartridge 38 and prevent relative longitudinal and rotational motion therebetween for the frictional and other forces encountered during use. Alternatively, the ends of the cartridge body and support spine may be rigidly affixed by other means such as end fittings to prevent rotational or longitudinal slippage during use.

Cartridge 38 may be about 3 to 4 inches in length and supports a sheet of film 40 on the outer surface thereof. Film 40 may be Kodak 7302 Fine Grain Positive film or one of several radiographic film grades. This film may be selected to have a relatively slow speed to prevent fogging by background radiation in steam generator 10, after operation in a nuclear steam generating system. Film 40 is preferably in the form of a strip extending most of the length of cartridge 38. Film 40 should remain as close to the inside surface of the tube 14' being inspected as possible. However, because it may tend to bend and possibly be damaged when transiting a bend in the tube 14' if wrapped entirely around cartridge 38, it has been found preferable to make a partial wrap of 180° or less. If the probe 36 is not required to transit any short-radius bends, film 40 might be wrapped entirely around cartridge 38.

An intensifying screen 42, of lead or other material, may cover the outer surface of or completely envelop film 40 in a manner well known in the art of radiography. Screen 42 is optional, its use being determined by the type and intensity of source pill 32, the type of film, and the workpiece in a manner well understood in the art of radiography. Such a screen is sometimes utilized in the preferred embodiment.

The film 40 (and screen 42) may be secured to cartridge 38 and shielded from exposure to light by light-opaque tape 44 wound tightly around the film and cartridge from end to end. A further seal against abuse, moisture, contamination, etc., may be provided by an envelope 46 of heat-shrink material or the like about the cartridge, film and tape. This combination provides a probe 36 having an outside diameter which may be only slightly less than the inside diameter of a tube 14, for instance 0.6 inches, to permit close, but smooth, passage therewithin.

Cartridge support spine 41 extends beyond the ends of cartridge 38, through envelope 46, sufficiently to permit a connection between it and a cable at one end and a connection between it and probe 110 at the other end. The form of connection and the nature of the cable or cables attached thereto will be discussed more thoroughly below. Suffice it to say here, that cables 48 and 50 are nonrotatably attached to the opposite ends of the probe train 100 to propel it within a tube 14', by pushing and/or pulling the cables from beyond the ends of tubes 14'. Cables 48 and 50 may each be long enough to extend the full length of the longest tube 14 and the distance to and somewhat beyond a manway 24 or 26. Guide tubes, to be described more thoroughly below, extend between the tube sheet 16 and one or both manways 24 and 26 to facilitate remote introduction of a cable 48 or 50 to a particular tube 14'.

The radiation source is preferably a capsule or pill 32 of a radioisotope, such as iridium, cobalt, ytterbium, thulium, gadolinium, thorium, or the like, which emits gamma radiation capable of passing through the wall of the tube containing the source and also the wall of the tube containing cassette probe 36. For example, pill 32 may be a piece of iridium 192 having a strength of 10–13 curies and enclosed in a small stainless steel housing. Pill 32 is affixed to the end of a long cable 34 which is sufficiently rigid to permit it to be pushed or driven into a source guide conduit, not shown, inserted within tube 14a, but is also flexible enough to follow the contour of the tube. The special steel cable commonly used in standard radiographic practice is satisfactory. Cable 34 is sufficiently long to permit pill 32 to be moved to any position along the length of the longest tube, preferably when introduced from only one end of tube 14, but at least when introduction from either end is possible. Cable 34 may be advanced and withdrawn by a conventional cable-feed mechanism, not shown. Pill 32 is withdrawn into and kept within a shielded container when the pill is fully retracted in accordance with standard industry practice. The source guide conduit is a blind-end tube of Nylon which prevents cable 34 and pill 32 from contacting the interior surface of a tube 14. The blind end of the source guide conduit is positioned at the preselected longitudinal position in tube 14 and pill 32 is then positioned by advancing cable 34 until the pill contacts the blind end.

In order to use the probes 36 and 110 of probe train 100, it is necessary to control or predetermine the angular or azimuthal orientation of the probe train relative to the tube 14' in which it is inserted. This is particularly true for directional eddy current probe 110, though it also applies to film cassette probe 36, particularly when film 40 does not completely encircle cartridge 38 but extends over an angle which might be no greater than 90°–120°.

Consideration will now be given to the means utilized to facilitate insertion of probe train 100 and pill 32 into their respective tubes 14 and, more importantly, the means and technique for accurately controlling the angular or azimuthal orientation of probe train 100 relative to the tube 14' in which it is inserted. As used herein relative to probe 36, probe 110 or probe train 100, the terms "angular orientation" and "azimuthal orientation" are synonymous and relate to the orientation of any point on the probes or probe train about its centerline and relative to a surrounding tube, such as 14' in which it is inserted.

Through use of elongated alignment means having a resilient naturally curved cast thereto and connected to one or both ends of probe train 100 it has been found possible to control the angular orientation of the probe train if it, or more precisely the alignment means, is caused to transit a curved length of the tube or other conduit through which it moves.

According to the preferred embodiment of the invention at least one, and preferably both of the probe train propelling cables 48 and 50 exhibit a naturally curved cast or cast and helix. Stated another way, cables 48 and 50 are elongated members, the axis or centerline of each tending to coil or curl substantially into a circle or helix when no external restraining forces are applied thereto. This property is exhibited by a variety of elongated members. For instance, various plastic tubings, coiled metal wire and metal tubes might develop this resiliently curved cast or cast and helix during the forming process which might include extrusion or drawing or the like. Alternately, this resilient naturally curved cast or cast and helix might subsequently be imparted to a straight metal rod or tube, as by bending it around a circular form in the nature of forming a spring or coil. Such material would of course exhibit a degree of resiliency or springiness which would allow it to be straightened somewhat and then return to the curved cast or cast and helix when the straightening forces are removed.

Figure 13:
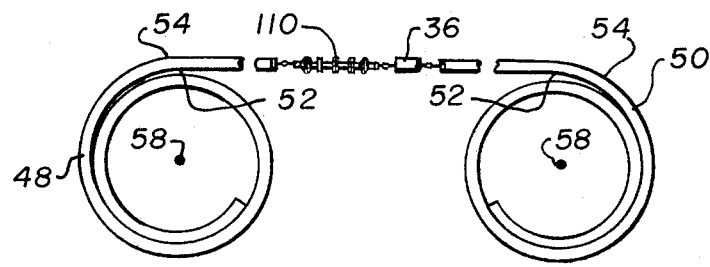
FIG. 13 shows the cables having the resilient naturally curved case used to angularly align and longitudinally position the probe train within the tube.

A particularly good example of a cable having the above properties and that used in the preferred embodiment for cables 48 and 50 is one comprising hollow plastic tubing, for instance a plastic such as nylon. A plastic material is preferred in this environment as it is generally chemically inert and nonabrasive, however a limited degree of longitudinal stretching generally attends this type of material. Both cables 48 and 50 are rather long lengths, up to 120 feet, of nylon tubing having a naturally curved cast thereto and typically having an outside diameter of about one-fourth inch to five-eighths inch. The nature of this cast is such that cables 48 and 50 tend to form circular coils when external forces are absent as in FIG. 13. With such characteristics, there exists an imaginary line, or inner arc 52, along the side of each cable 48 and 50 closest to the imaginary centers about which they naturally curve and there is another imaginary line, or outer arc 54, along the opposite side of each cable 48 and 50 most remote from their centers of curvature. These arcs 52 and 54 parallel the axes or center lines of each cable 48 and 50 on opposite sides thereof and lie in plane 56 which extends from the center of natural curvature of the cable through the longitudinally extending axis or centerline thereof. These imaginary centers of curvature are indicated as 58 in FIGS. 13 and 14 and lie in plane 56 referred to above, that plane being generally parallel the plane of the paper.

It has been found that when a cable such as 48 or 50 having this natural cast or curvature is inserted into a conduit which is curved along its length, or includes curved sections along its length as the U tubes 14, the plane 56 of cable curvature tends to align itself and be coincident with the plane 60 of conduit or tube 14' curvature. In FIG. 2, plane 60 is parallel the plane of the paper, extends through the centerline of tube 14' and includes centers of curvature 62 of tube 14'. More importantly, the alignment or coincidence of planes 56 and 60 occurs with the centers of natural curvature 58 of cables 48 and/or 50 to the same side of the cables and tube 14' as the centers of curvature 62 of the U tube. In other words, a cable 48 or 50, upon transiting a curved section of tube 14 will orient itself to one, and only one, predeterminable angular or azimuthal orientation relative to the tube. This is thought to be due to the cables seeking the path of "minimum work" or of "minimum imparted strain energy" due to their elastic deformations.

The natural outer arc 54 of a cable 48 or 50 will be immediately adjacent the comparable outer arc of a tube 14 and the natural inner arc 52 will of course be immediately adjacent the comparable inner arc of the tube. This relationship exists at least along the region of coextensitivity of cable 48 and/or 50 and a curved length of tube 14. If no twisting or torsional forces are applied along the length of cable not within a curved section of tube 14, that portion of the cable will also adopt the same angular orientation to the tube in which it extends.

Because of this characteristic of cables which have a curved cast, probe train 100 may be nonrotatably affixed to one, or preferably both, of cables 48 and 50 and its angular rotational orientation within a tube 14 will generally conform to that of each cable at its juncture with the probe train. As seen in FIG. 3, connection caps or plugs 64 are nonrotatably affixed to an end of each of cables 48 and 50 and both ends of support 124, as by crimping or bonding them thereto. Spine 41, which is substantially coaxial with probe 36, is nonrotatably affixed at one end to cap 64 on cable 50 and at the other end to cap 64 on one end of probe 110, as by engaging locking nuts 66, positive clamps, or the like. Similarly, cap 64 on the other end of probe 110 is nonrotatably affixed, as by locking nuts 66, to cap 64 on cable 48. Coaxial cables 142 and 144, as depicted in FIG. 3, may extend through holes in cap 64 in cable 48 or through an opening in the wall of the cable. Caps 64 and locking nuts 66 might be avoided by forming the probe train 100 as an integral portion of cable 48 or 50. Further, one cable might be greatly increased in length and the other omitted. However, such integral formation of probes and cables does not allow various configurations of probe 110 to be interchangably used with the cables.

This arrangement results in probes 36 and 110 and cables 48 and 50 being nonrotatably fixed relative to one another during operation, the rotational orientation of each relative to the other being preestablished and/or noted. Probes 36 and 110 will also be cut by plane 56 passing through their axes, as seen in FIG. 14 and will include a longitudinally extending line 54' radially outward of spine 41 and the centerline of probe 110 having the same angular relationship thereto as outer arc 54 of the cables and another longitudinally extending line 52' radially outward of spine 41 and the centerline of probe 110 and having the same angular relationship thereto as inner arc 52 of the cables.

The figures, particularly FIG. 14, show probes 36 and 110 and cables 48 and 50 within tube 14' and having their plane of natural curvature 56 coincident with the plane of curvature 60 of the tube, resulting in the aligned planes as indicated by 56, 60. The angular or azimuthal orientation of film 40 about the centerline of tube 14' is controlled by the initial angular positioning of the film about the centerline of the cartridge and relative to a reference such as line 54'. In the orientation depicted in FIG. 14, film 40 is centered about line 54' which is the 12 o'clock position herein. Similarly, coil means 112, 114 and 116 are of fixed azimuthal positioning about the centerline of probe 110.

If the probe 36 is to support film 40 in a position in tube 14' to record an image provided by gamma radiation emitted by pill 32 in a tube, for instance 14a, at a specific angular orientiation about tube 14', the operator need only preposition the film at that angular orientation about cartridge 38 which will place it in a line between the cartridge and the source tube 14a.

The above-described means and techniques for predetermining and accomplishing the angular orientation of probes 36 and 110 at selected locations along a tube having a curved section may be effective when at least part of the naturally curved cable 48 or 50 has transited at least part of the curved length of the tube. If probe train 100 is longitudinally close to that portion of a cable which is transiting, or has just transited, a curved section of tube 14', it will assume essentially the same angular orientation relative to the tube as the curve-transiting section of cable. If there are no other forces or effects serving to torsionally twist cables 48 and 50, then the probe train will assume the same angular orientation relative to tube 14' as the curve-transiting section of the cable, even if it is many feet distant therefrom. This latter situation might occur in a U tube 14 if the only pushing-pulling forces applied to cables 48 and/or 50 were directed parallel the vertical runs of the tube, but this may not always be practicable as the cables are led out through manways 24 and 26 at an angle to the U tubes and the moving forces are applied outside vessel 12. In such instance, the angular orientation of probe train 100 relative to tube 14' might be the predeterminable pattern seen in FIG. 14 only when it is in close longitudinal proximity to, or when it is in the region of or between, the bends or curves at the top of the tube. This limitation to the extent of a tube 14 along which probe train 100 will assume the above described predetermined angular orientation, while not wholly desirable, may be tolerable if the region of inspection is confined to the longitudinal extent of the tube near, including, or between the bend or bends of the tube nexus.

Otherwise, as the curvature plane of cables 48 and/or 50 might be twisted from the plane of curvature 60 of the tube 14 when they exit from the ends of the tube, they tend also to twist between the tube ends and the region of predeterminable alignment at and between the tube bends. If the extent of this twist is known and varies predictably between the tube bend and tube end, one might calculate or determine the rotational orientation of a probe 36 located therebetween by knowing its longitudinal location and computing the extent of the twist thereat. However, further means may be provided for avoiding this torsional displacement effect and the need for computation of the extent of twist at the probe train 100 when it is along the vertical run of the tube and distant from the bend.

Figure 16:
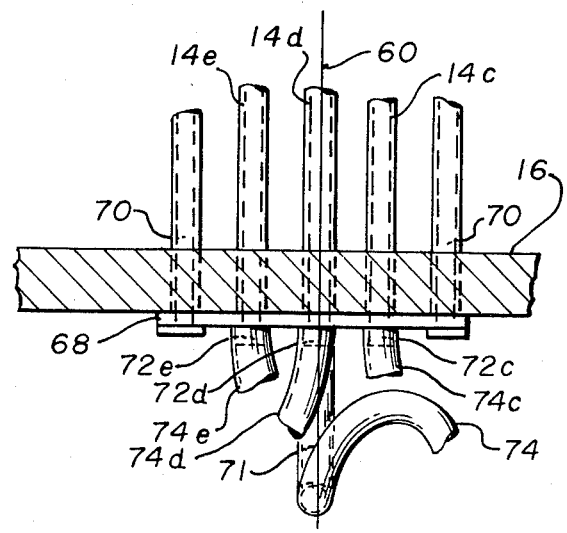
FIG. 16 is an elevational view of the cable guiding and aligning fixtures of FIG. 15 taken along line 16—16 therein.

Referring to FIGS. 1, 15 and 16, there is depicted a fixture plate 68 adapted to be fixedly supported adjacent the undersurface of tube sheet 16, as by expandable fingers 70 which may lockingly engage the inside wall of specific tubes 14 other than those involved in the inspection steps. Alternately, fixture 68 might be carried by or form an integral part of a remotely movable platform such as described in U.S. Pat. application Ser. No. 384,658 for Remotely Movable Platform by C. T. Ward, D. L. Mathis, F. T. Radcliff and R. Vorwerk, filed Aug. 1, 1973, and U.S. Pat. application Ser. No. 384,657 for Remotely Movable Platform by C. T. Ward, D. L. Mathis, F. T. Radcliff and E. Ranger, filed Aug. 1, 1973. Fixture 68 preferably includes a plurality of vertical, circular openings therethrough positioned to be in registry with the ends of a group of tubes 14, for instance tubes 14' and 14a–f of FIGS. 1 and 11. Tubes 14a–f are those immediately adjacent tube 14' at 60° intervals thereround. The openings are of substantially the same diameter as the I.D. of tubes 14. Hollow nipples 72a–f extend downward a short distance from the six openings in registry with tubes 14a–f respectively. Hollow flexible tubular guide conduits 74a–f are affixed at one end to nipples 72a–f respectively, and extend out of vessel 12 through manway 26 to another fixture 76 similar to fixture 68 and supported outside vessel 12.

A curved tube extension 71 extends nonrotatably downward from fixture 68 at the central opening in registry with the end of tube 14'. Extension 71 serves as a curved extension to tube 14' and provides a similar function as the bends in the tube. Extension 71 may be a rigid member having the required curvature, though it may be of a material which has a resilient natural cast thereto, similar to cables 48 and 50. The plane containing the centerline of extension 71 and its center, or centers, of curvature is common with the plane of curvature 60 of tube 14′. Further, the center, or centers of curvature of extension 71 are to the same side of the tubular extension as are the centers of curvature 62 to the tube 14′, as viewed in one longitudinal direction. Extension 71 has substantially the same internal diameter as tube 14′ and might extend downward from fixture 68 up to about a foot or more. The curved portion of extension 71, if rigid, consists of a bend of approximately 90° or less having a radius of about 5 to 20 or more inches. This curvature generally corresponds in order of magnitude with that of a typical bend in tube 14 in bundle 15.

A flexible tubular guide conduit 74′ is affixed at one end to the lower end of extension 71 and extends out through manway 26 to fixture 76, to which its other end is affixed.

It may, for special circumstances, be desirable to position another fixture 78 at the other end of tube 14′, particularly if both cables 48 and 50 are used with probe train 100 requiring their leadout through both manways 24 and 26 at the same time and if the probe train must be positioned at any point along tube 14′. Fixture 78 may be similar to fixture 68, though it may be provided with but one opening, in registry with the other end of tube 14′, if the cable 34 is long enough to permit radiation pill 32 to be moved to any needed position within tube 14′ from a single entry through fixture 68 side.

A tubular nipple in registry with the other end of tube 14′ might extend down from fixture 78 and include a flexible guide conduit leading to manway 24 to facilitate introduction and removal of cables 48 and/or 50 to and from tube 14′. If probe train 100 is to be used only between a bend of tube 14′ and that end of the tube proximate extension 71, then there is no particular need for the nipple and guide conduit of fixture 78 to adhere to the geometrical constraints of extension 71. On the other hand, if the probe train is to assume the afore described angular positioning at all points along the length of tube 14′, it will be preferably for fixture 78 to include a curved extension similar to that of fixture 68.

Accordingly, a tube extension 73 in registry with the end of tube 14′ extends downward from fixture 78 and is of a geometry identical to that of extension 71. The plane of curvature of extension 73 is also the same as for extension 71 and is the plane of curvature 60 for tube 14′. Similarly, the center, or centers, of curvature of extension 73 are to the same side of the extension as are the centers of curvature 62 to the tube 14′, when traveling longitudinally in one direction. A flexible tubular guide conduit 75′ is affixed at one end to the lower end of extension 73 and extends out through manway 24 to a mount similar to fixture 76 and not shown here.

While an embodiment has been described and depicted in which extension 71 was a separate, usually rigid member to which conduit 74′ was attached, it will be appreciated that conduit 74′ might be extended to a short nipple on fixture 68, avoiding the use of extension 71. In effect, conduit 74′ would then also serve the function of extension 71 to provide a curved path for probe train 100 prior to its entering tube 14′. Of course the constraints on extension 71 will also apply to the end of guide conduit 74′ affixed to fixture 68. Conduit 74′ will be nonrotatably affixed to fixture 68, or a nipple thereof, such that its plane of natural curvature thereat coincides with plane of curvature 60 of tube 14′. However, the guide conduit 74′ may descend or depart from fixture 68 in a gentle, large radius (5–10 feet) helical path which leads out manway 26 to fixture 76, and possibly beyond. This use of extended guide conduit 74′ to replace discrete extension 71 may permit operation in a tube 14′ located somewhat closer to divider 18 than might be permitted by a rigid extension 71, as in FIG. 1. Care should be taken however, because of the large radius of conduit 74′, to insure that the plane of natural cast of cable 48 be coincident with that of guide conduit 74′ when the former is introduced to the latter. A similar arrangement of conduit 75′ might also be used as a substitute for discrete extension 73.

The use of curved extensions to tube 14′, such as extensions 71 and 73, permits the angular orientation of probe train 100 to be controlled and known along the vertical linear sections of the tube, as well as at the region of and between the bends at the top of the tube. With these extensions, the cable 48 or 50 passing through guide conduit 74′ or 75′ will become oriented in the single predeterminable angular orientation described earlier upon transiting the curved length of the extension prior to entering tube 14′ proper. Correspondingly, probe train 100 will be similarly oriented while transiting the curved extension, as earlier described. Thus probes 36 and 110 will assume the aforedescribed predetermined angular orientation prior to entering tube 14′ and will retain this orientation throughout its length because the tube bends are in the same plane and direction as the bend in the extension, and because angular displacement errors from torsional or twisting force have been avoided.

Reference is now made to the preferred, though not necessarily only, manner in which probe train 100 is used in detecting and/or inspecting an irregularity, such as recess or crack 31 or 33. The existence and longitudinal position of the irregularity might have been previously established by a simple, easily moved sensor of the ultrasonic or eddy current type or the like, by passing the sensor within the length of tube 14′.

Alternatively, eddy current probe 110 of probe train 100 might be used for this initial detection. In either event, cable 48 and/or 50 will be, or will have been, inserted in tube 14′ and propelled therein by a force applied to cable 48 and/or 50 outside generator 12 such that eddy current probe 110 longitudinally scans or passes each irregularity to provide the angular direction indicating signals depicted in FIG. 10. As earlier described, the excursions of these signals provide information which enables the angular or azimuthal position of an irregularity relative to probe 110 to be determined with a good degree of accuracy. Because probe 110 is non-rotatable relative to probe 36 and cables 48 and 50, the relative angular position of the discontinuity indicated will thus be known for, or relative to, probe 36.

This information establishes, with a good degree of accuracy, the angular location of an irregularity around the wall of tube 14′ and relative to the axis thereof. With knowledge of the angular location of an irregularity, analysis of the reasons for its existence might be undertaken and also importantly, the tube or tubes into which radioactive source pill 32 must be inserted is established, as for instance tube 14a for the flaw 31 at the 12 o'clock position. By knowing the angular location of the irregularity, the need to radiographically inspect the tube from all angles thereat is avoided.

Following determination of the angular location of a flaw or irregularity, it is then radiographically inspected. If the irregularity occurs in a region of tube 14' that doesn't require film probe 36 to transit a small radius bend, then film 40 might extend completely around the probe and the probe train 100 need only be moved longitudinally a short distance following the angular location determining operation, to bring it laterally or radially opposite the irregularity. If, on the other hand, probe 36 must transit a tight bend, film 40 will preferably only partially encircle the probe and it will be necessary, after the eddy current position determining operation, to withdraw probe train 100 from tube 14' and angularly position the film in the indicated angular location about the probe. Then probe train 100 and associated cables are reinserted in tube 14' to the longitudinal position which places probe 36 laterally or radially adjacent the irregularity to be radiographed. Eddy current probe 110 may be used during this reinsertion operation to reestablish and verify the longitudinal and angular positioning of the probe train, particularly probe 36, relative to tube 14' and the flaw. If probe 110 is used to establish (or reestablish) the longitudinal position of the flaw, there will be little chance for error in the subsequent longitudinal positioning of probe 36, even assuming stretch of cables 48 and/or 50, because the two probes are longitudinally close to and generally fixedly spaced from one another.

The stretching of cable 48 or 50 and the attendant inaccuracy in longitudinal positioning of probe 36 may be reduced through the use of a metal cable, not shown, which may extend in each of hollow cables 48 and/or 50. One end of the metal cable is secured to the cap 64 at one end of the cable 48 or 50 and its other end extends out beyond the end of the surrounding cable 48 or 50 to receive a "pulling" force. If such metal pulling cable is used, it is preferable that it be of stainless steel or other nonmagnetic material at or near eddy current probe 110.

Pill 32 is introduced through the appropriate guide conduit and tube, in this instance 74a and 14a respectively, to a longitudinal position adjacent the flaw 33. Another tube more remote from tube 14' than tube 14a might be used to house pill 32, the only requirements being that it have a generally similar angular relationship to tube 14' and that it not be so remote that the radiation on the flaw 33 is seriously attenuated. Pill 32 is preferably first positioned and probe 36 bearing film 40 is subsequently positioned adjacent thereto, however if the angular eddy current inspection and the film positioning can be accomplished in a single step without removal of probe 36, then pill 32 may be quickly inserted in the indicated tube following positioning of the film bearing probe.

The probe 36 and pill 32, once positioned on opposite sides of the irregularity 33, remain so positioned for sufficient time to expose film 40 to gamma radiation from pill 32. This exposure is sufficient to result in the formation of an image on the film 40 of the target tube wall existing between the film and the pill. In essence, the sharpest and best defined images appearing on film 40 will result from anomalies or flaws in the wall of tube 14' immediately adjacent the film, though a flaw in the wall of tube 14a or other intervening tubes might create a fuzzy and weak image also. For the film cassettes and radiation sources described herein, probe 36 is typically allowed to remain at the inspection location for about 1/10 to 10 or more minutes and is then quickly withdrawn from tube 14' and steam generator 10.

This operation results in the radiographic inspection and recording of the features of an arc portion of tube 14' about its center line or axis, that arc portion (about 100 percent) being limited by the angular coverage of film 40 and the region thereof irradiated by pill 32, as seen in FIG. 12. Typically, the angular extent of optimun inspection coverage for a single positioning of probe 36 and pill 32 is between about 45° and 60° to each side of a line extending between centers of tubes 14' and 14a and relative to the center of tube 14'. This permits inspection of about one-fourth to one-third of the circumference of tube 14' with a single installation of probe 36 and pill 32. This is usually sufficient, however if a flaw has a large angular extent it may be necessary to repeat the operation with the pill 32 in another tube such as 14b.

While the preferred embodiment of the present invention has been described herein, it should be understood that the description is merely illustrative and that variations and modifications can be made therein without departing from the spirit and scope of the invention as recited in the following claims.

What is claimed is:

1. An inspection system for a multitube steam generator comprising:
   a. a probe train for insertion in a tube to be inspected including, in series:
      i. directional probe means for indicating the longitudinal and angular location of an irregularity at the wall of said tube, and
      ii. radiation responsive recording means, nonrotatable relative to said directional probe means and in substantially close longitudinal relationship thereto, for receiving an image of said irregularity when laterally adjacent thereto and said irregularity is irradiated;
   b. elongated alignment means having a resilient, naturally curved cast thereto and joined to at least one end of said probe train against rotation relative thereto and insertable in said tube for controlling the angular orientation of said probe train within said tube;
   c. means for propelling said probe train longitudinally within said tube; and
   d. a source of radiation insertable in another tube of said steam generator to a position therealong laterally adjacent said indicated irregularity for irradiating said irregularity to project said image on said recording means.

2. The apparatus of claim 1 wherein said alignment means and propelling means comprise a cable affixed to at least one end of said probe train.

\* \* \* \* \*